United States Patent [19]

Deatcher et al.

[11] Patent Number: 4,496,628

[45] Date of Patent: Jan. 29, 1985

[54] LAMINATE FOR THE PROTECTION OF MOTOR VEHICLE BODIES

[75] Inventors: John H. Deatcher, Lake Peekskill; Jagadish C. Goswami, New City, both of N.Y.

[73] Assignee: Stauffer Chemical Company, Westport, Conn.

[21] Appl. No.: 515,403

[22] Filed: Jul. 20, 1983

[51] Int. Cl.³ .............................................. C09J 7/02
[52] U.S. Cl. .................................. 428/337; 428/31; 428/40; 428/332; 428/343; 428/518
[58] Field of Search ................ 428/343, 332, 518, 31, 428/337, 40, 339, 220; 526/278

[56] References Cited

U.S. PATENT DOCUMENTS

| | | | |
|---|---|---|---|
| 4,147,853 | 4/1979 | Goswami et al. | 526/278 |
| 4,207,372 | 1/1980 | Sahara | 428/220 |
| 4,223,054 | 9/1980 | Schramer et al. | 428/40 |
| 4,252,853 | 2/1981 | Sahara | 428/339 |
| 4,282,286 | 8/1981 | Sahara | 428/339 |
| 4,343,856 | 8/1982 | Goswami et al. | 428/332 |

*Primary Examiner*—Thomas J. Herbert
*Attorney, Agent, or Firm*—Richard P. Fennelly

[57] ABSTRACT

A laminate for the protection of motor vehicle bodies from abrasion and corrosion damage which has a film component comprising an internally plasticized vinyl chloride copolymer resin and an effective amount of a polymeric additive for improving the flexibility of the film and an adherent layer of pressure sensitive adhesive.

15 Claims, No Drawings

LAMINATE FOR THE PROTECTION OF MOTOR VEHICLE BODIES

BACKGROUND OF THE INVENTION

1. Field of the Invention

The present invention relates to a laminate for the protection of motor vehicle bodies from abrasion damage.

2. Description of the Prior Art

Laminates for the protection of motor vehicles which comprise a plastic film coated with a layer of pressure sensitive adhesive are known products. They are commonly referred to as "rocker panel laminates" since they are often affixed to the rocker panels and adjacent portions of motor vehicles to protect those portions of the vehicles from abrasion and corrosion damage caused by rocks, gravel, and the like which are thrown against the vehicle body by the action of the vehicle's tires. Such laminates utilize a relatively thick plastic film (e.g., from about 200 microns to about 350 microns or thicker) in order to confer the desired degree of abrasion and corrosion resistance on the vehicle body. Conventional laminates of this type have contained either polyurethane or externally plasticized polyvinyl chloride. An example of an externally plasticized vinyl chloride polymer laminate is PROCAL protective film from Stauffer Chemical Company.

Although marking film laminates have been proposed which contain internally plasticized vinyl chloride copolymer resins (i.e., U.S. Pat. No. 4,343,856 to J. C. Goswami et al.). such products are much thinner (i.e., 50–125 microns) than the thickness desired for rocker panel laminates (i.e., 200–350 microns). Merely increasing the thickness of the type of marking film product described in the aforementioned patent will not, however, yield a satisfactory rocker panel laminate since the product would not have the desired degree of flexibility to protect a motor vehicle body from abrasion damage without also being damaged itself because of its lower impact resistance at low temperature thereby detracting from its aesthetic appeal.

SUMMARY OF THE PRESENT INVENTION

The present invention relates to a protective laminate for a motor vehicle which comprises an internally plasticized vinyl chloride copolymer resin and an effective amount of a polymeric additive to improve the flexibility of the laminate.

DESCRIPTION OF THE PREFERRED EMBODIMENTS OF THE PRESENT INVENTION

The laminates of the present invention contain a film and a layer of pressure sensitive adhesive attached to one side of the film. As an optional, though preferred, additional component, a protective release liner is attached to the exposed side of the pressure sensitive adhesive layer remote from the side attached to the film. The release liner protects the adhesive from contamination by undesired foreign substances when the laminate is stored prior to its intended use.

The film component of the laminate can be formed by calendering a suitably prepared film-forming composition to the thickness conventionally used in such products, e.g., from about 200 to about 350 microns. The film typically contains an internally plasticized resin, an effective amount of a polymeric additive for improvement of the flexibility of the laminate, filler, pigments (if desired), and such functional additives for the calendering process as process aids, stabilizers, lubricants, antioxidants, and the like.

The selected polymer component used in the rocker panel laminate of the present invention is an internally plasticized vinyl chloride copolymer resin. For purposes of the present invention, the terminology "internally plasticized" is to be construed as covering copolymers having an agent incorporated in the resin itself during polymerization to provide the needed degree of flexibility to films made containing the copolymer rather than to conventional vinyl chloride polymers or copolymers requiring external plasticizer during resin compounding to achieve such results.

Internally plasticized vinyl chloride copolymer resins suitable for use in the present invention can be formed by polymerizing vinyl chloride monomer in the presence of an effective amount (10% to 50%, by weight) of at least one comonomer which functions as an internal plasticizer. Included within this class are the alkyl acrylates and methacrylates containing up to about 18 carbon atoms in their alkyl moieties, the vinyl esters of carboxylic acids and ethylenically unsaturated dicarboxylic acids, their anhydrides, and their mono- and dialkyl esters containing up to about 20 carbon atoms in their alkyl moieties.

The internally plasticized resin suitable for use in the present invention should have a $T_g$ of from about $-10°$ C. to about 30° C. and should give a vinyl film having a Shore "A" Hardness of from about 80 to about 95 when in the absence of functional additives and when no substantial amounts of plasticizer are present.

A preferred internally plasticized copolymer resin for use in the laminate of the present invention is described in U.S Pat. No. 4,147,853 to J. C. Goswami et al., which is incorporated herein by reference. This copolymer comprises: (1) from about 50% to about 85%, by weight, vinyl chloride; (2) from about 3% to about 47%, by weight, of a $C_6$–$C_{10}$ alkyl acrylate; and (3) from about 47% to about 3%, by weight, of a bis (hydrocarbyl)vinylphosphonate of the formula:

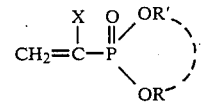

wherein X is selected from the group consisting of hydrogen, halogen, cyano, aryl, such as phenyl, $C_1$–$C_{18}$ alkyl and

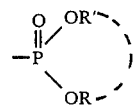

wherein R and R' are hydrocarbyl and substituted hydrocarbyl groups consisting essentially of hydrogen and carbon, and containing up to about 18 carbon atoms, inclusive, with the proviso that R and R' may be the same, different or conjoint, i.e., R and R' may combine to form one single radical.

Preferred weight amounts for the comonomers used to make the copolymer are: (1) from about 55% to about 80%, by weight, vinyl chloride; (2) from about 10% to about 35%, by weight, of the acrylate; and (3)

from about 5% to about 25% by weight of the vinylphosphonate. A particularly preferred acrylate is 2-ethylhexyl acrylate, while particularly preferred vinylphosphonates are bis(beta-chloroethyl)vinylphosphonate and bis(2-ethylhexyl)vinylphosphonate.

The aforementioned internally plasticized copolymer can be formed by conventional bulk, emulsion, suspension, or solution polymerization procedures, although suspension polymerization is preferred.

Also useful in the present invention is the internally plasticized resin described in U.S. Pat. No. 4,210,739 to R. E. Gallagher et al. which comprises from about 45% to about 80%, by weight, vinyl chloride, from about 15% to about 54%, by weight, of a $C_2$–$C_{10}$ alkyl acrylate, and from about 10% to about 15%, by weight, of at least one $C_8$–$C_{22}$ dialkyl maleate or fumarate.

The use of the above-described internally plasticized resin allows for production of a film having the desired degree of flexibility without the use of any significant amount of external plasticizer such as employed in certain prior art films. Liquid, external plasticizer tends to migrate from the film into either the adhesive layer or into the air causing such problems as reduction of the adhesion strength of the product or embrittlement of the film. Generally speaking, the amount of internally plasticized resin in the vinyl film can range from about 40% to about 80%, by weight of the film depending upon the precise type of film required in the laminate of the present invention.

In order to enhance the flexibility of the film, especially at low temperatures, so that the laminate confers an acceptable degree of abrasion and corrosion protection without itself being subjected to cracking damage, the film also contains an effective amount of a polymeric additive to soften or confer greater flexibility on the laminate. Generally speaking, this additive is present from about 10% to about 25%, by weight of the film. Representative additives which can be used include ethylene/carbon monoxide terpolymers (as described in U.S. Pat. No. 3,780,140), thermoplastic polyurethane elastomers, chlorinated polyethylene, acrylonitrile-butadiene copolymer rubbers, etc.

A number of other additives can also be present in making the polymeric film component contained in the products of the present invention. Included as potential addities are the following:

(a) fillers and/or pigments. The amount of filler that is chosen can range from about 0% to about 10%, by weight. Fillers and pigments are used to provide desired color to the film to provide opacity and to aid in the calendering of the film forming composition. Representative fillers include such inorganic fillers as titanium dioxide, calcium carbonate, zinc oxide, lead white, gypsum, precipitated silica, carbon black, and red iron oxide. Others are well known to the person of ordinary skill in the art.

(b) monomeric and polymeric process aids. These additives serve to aid in the processing of the calenderable film forming composition as well as give the film favorable visual appearance. Included are such polymeric additives as PVC/acrylate copolymer and chlorinated polyethylene, which produce a smooth surface on the calendered film, and alpha methyl styrene or acrylic polymers which function as a process aid. These additives may be used at from about 2% to about 10%, by weight of the film.

(c) lubricants. These may be present at from about 0.5% to about 3%, by weight of the film. Included as representative lubricants are stearic acid, stearamide, the polyethylene waxes, hydrocarbon oils, and the like.

(d) stabilizers and antioxidants. These may be present at from about 3% to about 10%, by weight of the film. Included are the stearate salts, the epoxidized vegetable oils, dibasic lead phosphite, and dibutyl tin dilaurate, dimaleate or mercaptide. Others that may be selected are well known to persons of ordinary skill in the art.

Other functional additives that can be present in relatively minor amount (under 2%, by weight, of the film) include ultraviolet light stabilizers, drying agents, and the like.

The first step in forming the laminate of the present invention, in accordance with a preferred embodiment is the formation of a film forming composition which can be calendered and which has good chemical resistance and outdoor durability. The aforementioned internally plasticized resin polymer additive, filler and/or pigment, monomeric and polymeric process aid, lubricant, and stabilizers and antioxidant components can be selected in the aforementioned amounts, if desired. These selected ingredients are mixed until they are in the form of a homogeneous powdery composition. They can be then mixed under sufficient heat and pressure to yield a composition of a more fluid consistency. After passing through a strainer apparatus they are ready for calendering.

This film formulation is then calendered at a temperature and pressure which allows formation of a film having a preferred thickness of about 280 microns. A calendering temperature of from about 120° C. to about 160° C. is recommended. After formation of the film by calendering, the next step in forming the product of this invention is to coat a suitable release paper with a desired pressure sensitive adhesive. Acrylic pressure sensitive adhesives are a preferred class of adhesive. In general, the same type of adhesives described in U.S. Pat. No. 4,223,054 to K. M. Schramer et al. can be utilized in the laminate of the present invention.

Typical adhesives include Acrylic Solution Nos. 72-9297 and 72-9283 from National Starch and Chemical Corporation and PS-51 from Ashland Chemical Company. The thickness of the adhesive layer is generally in the neighborhood of 25 microns to 35 microns.

The adhesive coated release paper and film component can then be laminated to one another by conventional means.

The present invention is further illustrated by the Examples which follow.

EXAMPLE 1

This Example illustrates how two laminates in accordance with the present invention have been fabricated.

Two calenderable film forming compositions are formed by mixing the ingredients below at about 160° C. in a two-roll mill for about 20 minutes until homogeneous, followed by extraction of a film having a thickness of about 254 microns. The following ingredients were used to make the films:

| Ingredients | FILM NO. (Parts by Weight) | |
| --- | --- | --- |
| | 1 | 2 |
| Internally plasticized vinyl chloride copolymer* | 60 | 60 |
| Ethylene/vinyl acetate/carbon monoxide terpolymer (ELVALOY 741P brand) | 18 | — |

| | FILM NO. (Parts by Weight) | |
|---|---|---|
| Ingredients | 1 | 2 |
| Thermoplastic polyurethane elastomer (ULTRAMOL PU brand) | — | 18 |
| Fumed silica (CAB-O-SIL M-5 brand) | 0.6 | 0.6 |
| Carbon black (THERMAXFLOW FORM brand) | 3.0 | 3.0 |
| 2-hydroxy-4-n-octoxybenzophenone ultraviolet stabilizer (UV 531 from American Cyanamid) | 1.0 | 1.0 |
| Bis-stearamide lubricant (ADVAWAX 240 brand) | 0.6 | 0.6 |
| Partially oxidized polyethylene | 2.0 | 2.0 |
| Dioctyl azelate plasticizer | 3.0 | 3.0 |
| Zinc heat stabilizer (SYNPRON 1402 brand) | 3.0 | 3.0 |
| Barium/cadmium heat stabilizer (SYNPRON 1517 brand) | 1.0 | 1.0 |
| Epoxidized soya oil (G-62 brand) | 2.5 | 2.5 |
| Anhydrous aluminum silicate filler (BURGESS KE brand) | 5.3 | 5.3 |

*comprised about 75%, by weight, vinyl chloride, about 18% by weight, 2-ethylhexyl acrylate, and about 7%, by weight, bis(beta-chloroethyl)vinylphosphonate.

The film/adhesive laminate was then formed by laminating the adhesives described below and each of the films described heretofore by the following procedure. The adhesives described below were placed on a clay backed release paper by using a Gardner blade to produce a 25–35 micron thick adhesive layer. The film was then applied to the adhesive by using a hand held hard rubber roller about eight inches wide under moderate hand pressure following by room temperature curing for 24–72 hrs. Removal of the release paper allowed for testing of the product as described in later examples.

The adhesive compositions that were applied to the release paper were as follows:

Adhesive A: was a commercially available crosslinkable acrylic pressure sensitive adhesive sold under the trademark DUROTAK 80-1053 by National Starch and Chemical. It had a 30%–32%, by weight, solids content, comprised a solvent fraction of 86%, by weight, ethyl acetate and 14%, by weight, toluene, and had a viscosity of about 3000–4500 cps.

Adhesive B: was a commercially available self-crosslinkable acrylic pressure sensitive adhesive sold under the trademark DUROTAK 72-9283 by National Starch and Chemical. It had a 40%, by weight, solids content, a solvent of 40% ethyl acetate, 28% heptane, 30% isopropyl alcohol, and 2% toluene, and a viscosity of about 5000 cps.

EXAMPLE 2

This Example shows the adhesion characteristics when a series of laminates in accordance with the present invention were subjected to a 180° peel adhesion test to stainless steel, Fisher Body painted, and Q-aluminum substrates under various conditions.

Peel adhesion is determined by bonding 2.54 cm. wide strips of the laminate to the selected panel using the standard Pressure Sensitive Tape Council 2.04 kg. roller. The peel adhesion at 180° was then measured after a suitable wet out or "dwell" period on a Thwing-Albert type tester as the samples were peeled at the rate of 300 mm./minute.

The Table set forth below shows the adhesion values (in gm/cm.) that was obtained:

| Film No./ Adhesive | Dwell Time and Temperatures | | | |
|---|---|---|---|---|
| | 24 hrs. at RT | 72 hrs. at RT | 168 hrs. at RT | 168 hrs. at 158° F. |
| STAINLESS STEEL ADHESION | | | | |
| 1/A | 411 | 304 | 357 | 875 |
| 1/B | 839 | 607 | 1072 | 1125 |
| 2/A | 393 | 357 | 357 | 804 |
| 2/B | 750 | 714 | 964 | 1250 |
| FISHER BODY PAINTED PANELS | | | | |
| 1/A | 1500 | 1429 | 1786 | 1786 |
| 1/B | 804 | 822 | 857 | 1161 |
| 2/A | 1340 | 1375 | 1786 | 1786 |
| 2/B | 786 | 857 | 893 | 1072 |
| Q-ALUMINUM PANELS | | | | |
| 1/A | 178 | 214 | 286 | 268 |
| 1/B | 429 | 429 | 679 | 447 |
| 2/A | 250 | 250 | 286 | 375 |
| 2/B | 464 | 589 | 625 | 625 |

EXAMPLE 3

The laminates tested in Example 2 were also tested for various physical properties in accordance with Fisher Body Material Standard (FBMS) 6-3. The following characteristics and physical values were noted for the tested laminates. All samples were mounted on painted stainless steel panels for a seventy-two hour "wet-out" period prior to testing:

| Film No./Adhesive | Thickness (microns) | Tensile Str.[1] (MPa) | Elongation[2] (%) | Aged Elongation[3] (%) | Strip Tensile[4] (MPa) | Abrasion Resist.[5] | Condensation Humidity[6] | Peel Adhesion[7] (gm/cm) | Scratch[8] Resistance | Fuel[9] Resistance |
|---|---|---|---|---|---|---|---|---|---|---|
| 1/A | 297.2 | 10.13/8.90 | 283/313 | 236/217 | 11.90/10.26 | OK | OK | 1125 | OK | OK |
| 1/B | 279.4 | 9.46/8.04 | 223/311 | 276/259 | 12.66/11.19 | OK | OK | 911 | OK | OK |
| 2/A | 332.7 | 10.68/10.06 | 310/318 | 259/303 | 10.34/12.19 | OK | OK | 1143 | OK | OK |
| 2/B | 297.2 | 10.02/9.65 | 280/321 | 263/266 | 12.92/11.49 | OK | OK | 1018 | OK | OK |

| Film No./Adhesive | Detergent Resistance[10] | High Temperature Resistance[11] | Heat Aging[12] | GRAVELOMETER Test[13] | Environmental Cycle (2 weeks)[14] | Salt Spray Test[15] | WEATHEROMETER Apparatus Test[16] |
|---|---|---|---|---|---|---|---|
| 1/A | OK | OK | OK | OK | OK | OK | OK |
| 1/B | OK | OK | OK | OK | OK | OK | OK |
| 2/A | OK | OK | OK | OK | OK | OK | OK |
| 2/B | OK | OK | OK | OK | OK | OK | OK |

[1] the figure before the slash represents tensile strength in a direction parallel to the machine direction (MD) of calendering of the film; the figure after the slash, perpendicular to the direction of calendering, namely, the transverse direction (TD). Sample size - 25 mm. × 150 mm.; crosshead rate - 125 mm./min.; and jaw separation - 75 mm.
[2] the figures represent MD/TD values as received
[3] the figures represent MD/TD values after oven aging at 158° F. for seven days
[4] after oven aging at 158° F. for seven days. Represent MD/TD values.
[5] "OK" indicates no surface effects, loss of pattern or wear through after 1000 cycles on a TABER wear tester using a CS17 wheel and -continued a 0.5 kg applied load.
(6)"OK" indicates no surface deterioration, objectionable shrinkage, objectionable color or gloss change, delamination or loss of adhesion after a functionally installed sample is exposed for seven days at 38° C. in a cabinet at 100% relative humidity.
(7)laminate tested in accordance with condensation humidity test (6).
(8)"OK" means there are no visible scratches on the surface when tested with a 0.3 kg. load on a GARDNER HOFFMAN hardness tester.
(9)dipped into an 85/15 blend of isooctane and xylol ten times (ten sec. in and twenty sec. out); "OK" means there was no color change, loss of bond, material degradation or tackiness.
(10)"OK" indicates there was no effect on the material when it is immersed in a solution of one part of JOY brand liquid detergent per one hundred parts of water for twenty-four hours.
(11)"OK" indicates there was no blistering, objectionable shrinkage, delamination, or other objectionable observations when the laminate and substrate were exposed at 93° C. for one hour in an air circulating oven.
(12)"OK" indicates no blistering, objectionable color or gloss change, loss of legibility, surface tackiness, crazing, blooming, delamination, objectionable loss of adhesion, or other indication of degradation after one week exposure in an air circulating oven at 158° F. The peel values for samples thus tested (in lbs./in min.) were: 1/A - 4.0; 1/B - 5.5; 2/A - 8.7; and 2/B - 4.4.
(13)"OK" indicates no cracking or delamination when kept at −29° C. for four hours and then tested in the GRAVELOMETER apparatus utilizing a 475 cc. container of stones approximately 10 mm. × 16 mm. at 550-690 kilopascals of air pressure. These results were noted for the bonded laminate both before and after the environmental cycle.
(14)"OK" indicates no effects (e.g., cracking) when the bonded laminate was exposed to two repetitions of the following cycle: 17 hours at −30° C.; 72 hours at 80° C.; 24 hours at 38° C. and 100% relative humidity; 7 hours at −30° C.; 17 hours at 38° C. and 100% relative humidity; 7 hours at 80° C.; and 24 hours at 38° C. and 100% relative humidity. At the end of
the second repetition of the cycle the following peel values (lb./in. min.) were obtained: 1/A - 5.8; 1/B - 5.7; 2/A - 4.3 and 2/B - 5.0.
(15)"OK" indicates no loss of adhesion or change in sample appearance after exposure to a 5% by weight concentration of salt in water when sprayed at 35° C. for 200 hours.
(16)"OK" indicates no surface tackiness, objectionable color or gloss change, blooming or blistering when exposed in an ATLAS DMC-W WEATHEROMETER for 1500 hours with a black panel temperature of 86°-89° C.

EXAMPLE 4

Another embodiment of the present invention was formed using the same materials described in Example 1 with the exception that the thermoplastic polyurethane elastomer component was replaced with a similar amount of an acrylonitrile-butadiene resin (HYCAR 1492 P-80 brand). The adhesive which was used was Adhesive A, as described in Example 1.

The following peel adhesion values (in pounds) were noted when tested in accordance with the procedure described in Example 2:

| Substrate | Dwell Times and Temperatures | | | |
| --- | --- | --- | --- | --- |
| | 24 hrs. at RT | 72 hrs. at RT | 168 hrs. at RT | 168 hrs. at 158° F. |
| Stainless Steel | 2.6 | 1.7 | 2.5 | 3.4 |
| Fisher Body Painted Panels | 7.8 | 7.5 | 9.4 | 8.4 |
| Q-Aluminum Panels | 1.1 | 1.3 | 1.6 | 1.5 |

The foregoing Examples should not be construed as limiting since they merely relate to certain embodiments of the present invention. The scope of protection sought is given in the claims which follow.

What is claimed is:

1. A laminate adapted for the protection of motor vehicle bodies from abrasion and corrosion damage when secured thereto which consists essentially of:
   (a) a film component having a thickness of at least about 200 microns comprising an internally plasticized vinyl chloride copolymer resin and an effective amount of a polymeric additive to enhance the flexibility characteristics of the film; and
   (b) a layer of pressure sensitive adhesive attached to one side of the film.

2. A motor vehicle body protected from abrasion and corrosion damage by having secured thereto the laminate of claim 1.

3. A laminate as claimed in claim 1 wherein the internally plasticized resin has a $T_g$ of from about −10° C. to about 30° C.

4. A laminate as claimed in claim 1 wherein the internally plasticized resin comprises from about 40% to about 80%, by weight of the film component.

5. A laminate as claimed in claim 1 wherein the internally plasticized resin comprises vinyl chloride and from about 10% to about 50%, by weight of at least one plasticizing comonomer.

6. A laminate as claimed in claim 1 wherein the pressure sensitive adhesive is an acrylic pressure sensitive adhesive.

7. A laminate as claimed in claim 1 in which the film contains from about 10% to about 25%, by weight of the film, of the polymeric additive.

8. A laminate as claimed in claim 1 wherein the polymeric additive is a thermoplastic polyurethane elastomer.

9. A laminate as claimed in claim 1 wherein the polymeric additive is an ethylene/carbon monoxide terpolymer.

10. A laminate as claimed in claim 1 wherein the film has a thickness of from about 200 to about 350 microns.

11. A motor vehicle body protected from abrasion and corrosion damage by having secured thereto the laminate of claim 10.

12. A laminate as claimed in claim 1 wherein the film component has a thickness of from about 200 to about 350 microns, the film component contains from about 40% to about 80%, by weight of the internally plasticized resin which comprises from about 50% to about 80%, by weight, vinyl chloride, from about 3% to about 47%, by weight of a $C_6$-$C_{10}$ alkyl acrylate, and from about 47% to about 3%, by weight, of a bis(hydrocarbyl)vinylphosphonate, and the pressure sensitive adhesive is an acrylic pressure sensitive adhesive.

13. A motor vehicle body protected from abrasion and corrosion damage by having secured thereto the laminate of claim 12.

14. A laminate as claimed in claim 12 which comprises from about 10% to about 25% by weight of the film, of a polymeric additive selected from the group consisting of thermoplastic polyurethane elastomer and ethylene/carbon monoxide terpolymer.

15. A motor vehicle body protected from abrasion and corrosion damage by having secured thereto the laminate of claim 14.

* * * * *